(12) United States Patent
Hafemann et al.

(10) Patent No.: US 11,321,694 B2
(45) Date of Patent: May 3, 2022

(54) TAMPER DETECTION USING ITO TOUCH SCREEN TRACES

(71) Applicant: SQUARE, INC., San Francisco, CA (US)

(72) Inventors: Sean Hafemann, Lafayette, CA (US); Cory Douthat, San Francisco, CA (US)

(73) Assignee: BLOCK, INC., San Francisco, CA (US)

( * ) Notice: Subject to any disclaimer, the term of this patent is extended or adjusted under 35 U.S.C. 154(b) by 182 days.

(21) Appl. No.: 16/690,786

(22) Filed: Nov. 21, 2019

(65) Prior Publication Data
US 2020/0090153 A1 Mar. 19, 2020

Related U.S. Application Data

(62) Division of application No. 15/581,871, filed on Apr. 28, 2017, now Pat. No. 10,504,096.

(51) Int. Cl.
| | |
|---|---|
| *G06Q 20/20* | (2012.01) |
| *G06F 3/044* | (2006.01) |
| *G06F 3/0488* | (2022.01) |
| *G06F 3/041* | (2006.01) |
| *G06F 21/86* | (2013.01) |

(52) U.S. Cl.
CPC .......... *G06Q 20/206* (2013.01); *G06F 3/044* (2013.01); *G06F 3/0416* (2013.01); *G06F 3/0488* (2013.01); *G06F 21/86* (2013.01)

(58) Field of Classification Search
CPC ........ G06Q 20/206; G06Q 20/20; G07G 1/01; G07G 11/01; G07F 19/209; G07F 19/205; G06F 3/044; G06F 3/0488; G06F 3/041; G06F 21/86

USPC .......................................................... 705/18
See application file for complete search history.

(56) References Cited

U.S. PATENT DOCUMENTS

| | | | |
|---|---|---|---|
| 3,276,032 | A | 9/1966 | Ordower |
| 4,691,350 | A | 9/1987 | Kleijne et al. |
| 4,811,288 | A | 3/1989 | Kleijne et al. |
| 5,233,505 | A | 8/1993 | Chang et al. |
| 5,574,600 | A | 11/1996 | Agro |
| 5,666,265 | A | 9/1997 | Lutz et al. |
| 5,880,523 | A | 3/1999 | Candelore |
| 6,084,905 | A | 7/2000 | Ishifuji et al. |
| 6,144,800 | A | 11/2000 | Kobayashi |

(Continued)

FOREIGN PATENT DOCUMENTS

| | | |
|---|---|---|
| DE | 195 12 266 A1 | 3/1996 |
| DE | 103 37 567 B3 | 1/2005 |

(Continued)

OTHER PUBLICATIONS

Extended European Search Report for European Patent Application No. 20156257.6, dated May 19, 2020.

(Continued)

*Primary Examiner* — Andrew Joseph Rudy
(74) *Attorney, Agent, or Firm* — Polsinelli PC (57) ABSTRACT

Aspects of the technology provide an electronic device having a touch display and a method of detecting any possible tampering with the electronic device using the same ITO traces of a conductive grid of the touch display that are used to drive the touch display for displaying information and/or sensing touch inputs.

20 Claims, 5 Drawing Sheets

(56) References Cited

U.S. PATENT DOCUMENTS

| | | |
|---|---|---|
| 6,193,152 B1 | 2/2001 | Fernando et al. |
| 6,230,972 B1 | 5/2001 | Dames et al. |
| 6,234,389 B1 | 5/2001 | Valliani et al. |
| 6,247,645 B1 | 6/2001 | Harris et al. |
| 6,492,978 B1 | 12/2002 | Selig et al. |
| 6,557,754 B2 | 5/2003 | Gray et al. |
| 6,715,078 B1 | 3/2004 | Chasko et al. |
| 7,049,970 B2 | 5/2006 | Allen et al. |
| 7,343,496 B1 | 3/2008 | Hsiang et al. |
| 7,373,667 B1 | 5/2008 | Millard |
| 7,428,984 B1 | 9/2008 | Crews et al. |
| 7,474,550 B2 | 1/2009 | Fujisawa et al. |
| 7,806,341 B2 | 10/2010 | Farooq et al. |
| 8,310,370 B1 | 11/2012 | Williams, Jr. et al. |
| 8,701,997 B2 | 4/2014 | Dorsey et al. |
| 8,814,045 B1* | 8/2014 | Brockhouse ........... G07C 13/00 235/386 |
| 9,203,546 B1 | 12/2015 | Wade et al. |
| 9,298,956 B2 | 3/2016 | Wade et al. |
| 9,449,192 B1 | 9/2016 | Wade et al. |
| 9,554,477 B1 | 1/2017 | Brodsky et al. |
| 9,578,763 B1 | 2/2017 | Wade |
| 9,730,315 B1 | 8/2017 | Razaghi |
| 9,852,422 B1 | 12/2017 | Wade et al. |
| 9,880,649 B2* | 1/2018 | Agarwal ............ G06F 3/04166 |
| 9,913,778 B2 | 3/2018 | Dvorak et al. |
| 9,958,996 B2* | 5/2018 | Marques ............ G06F 3/0412 |
| 10,101,860 B2* | 10/2018 | Marques ............ G06F 3/04164 |
| 10,139,975 B2* | 11/2018 | Shutzberg ............ G06F 3/0418 |
| 10,140,604 B1 | 11/2018 | Douthat et al. |
| 10,192,076 B1 | 1/2019 | Razaghi |
| 10,251,260 B1 | 4/2019 | Razaghi |
| 10,455,441 B2* | 10/2019 | Baroudi ............ H04W 24/08 |
| 10,504,096 B1 | 12/2019 | Hafemann et al. |
| 10,595,400 B1 | 3/2020 | Razaghi et al. |
| 10,613,655 B2* | 4/2020 | Yoon ............ G06F 3/0488 |
| 10,733,589 B2* | 8/2020 | Douthat ............ G06F 1/3234 |
| 10,890,795 B2* | 1/2021 | Xie ............ G06F 3/0412 |
| 10,977,393 B2* | 4/2021 | Razaghi ............ G06F 21/87 |
| 11,003,913 B2* | 5/2021 | Lee ............ G06F 16/51 |
| 2001/0056542 A1 | 12/2001 | Cesana et al. |
| 2002/0060869 A1 | 5/2002 | Sawaguchi et al. |
| 2005/0039052 A1 | 2/2005 | O'Donnell et al. |
| 2005/0191878 A1 | 9/2005 | Castle |
| 2005/0218229 A1 | 10/2005 | Morley, Jr. et al. |
| 2005/0219728 A1 | 10/2005 | Durbin et al. |
| 2005/0275538 A1 | 12/2005 | Kulpa |
| 2006/0038011 A1 | 2/2006 | Baker et al. |
| 2006/0102458 A1 | 5/2006 | Kim et al. |
| 2006/0220850 A1 | 10/2006 | Bowser et al. |
| 2006/0238301 A1 | 10/2006 | Wu et al. |
| 2007/0131768 A1 | 6/2007 | Wakabayashi |
| 2007/0271189 A1 | 11/2007 | Morten et al. |
| 2007/0290845 A1 | 12/2007 | Benjelloun et al. |
| 2007/0293142 A1 | 12/2007 | Dehmas et al. |
| 2008/0110987 A1 | 5/2008 | Cato et al. |
| 2008/0164320 A1 | 7/2008 | Garrido-Gadea et al. |
| 2008/0278217 A1 | 11/2008 | Hankhofer et al. |
| 2008/0284610 A1 | 11/2008 | Hunter |
| 2008/0296377 A1 | 12/2008 | Hopt et al. |
| 2008/0309396 A1 | 12/2008 | Lee |
| 2009/0070658 A1 | 3/2009 | Patapoutian et al. |
| 2009/0291635 A1 | 11/2009 | Savry |
| 2010/0034434 A1 | 2/2010 | von Mueller et al. |
| 2010/0150465 A1 | 6/2010 | Lee et al. |
| 2010/0244818 A1 | 9/2010 | Atwood et al. |
| 2010/0327856 A1 | 12/2010 | Lowy |
| 2011/0031985 A1 | 2/2011 | Johnson |
| 2011/0048756 A1 | 3/2011 | Shi et al. |
| 2011/0090658 A1 | 4/2011 | Adams et al. |
| 2011/0135092 A1 | 6/2011 | Lehner |
| 2011/0253788 A1 | 10/2011 | Campbell et al. |
| 2012/0000982 A1 | 1/2012 | Gao et al. |
| 2012/0002313 A1 | 1/2012 | Miyabe et al. |
| 2012/0009826 A1 | 1/2012 | Selwood |
| 2012/0047374 A1 | 2/2012 | Klum et al. |
| 2012/0056755 A1 | 3/2012 | Hanft |
| 2012/0091201 A1 | 4/2012 | Babu et al. |
| 2012/0151607 A1 | 6/2012 | Chambourov |
| 2012/0163434 A1 | 6/2012 | Kim et al. |
| 2012/0286760 A1 | 11/2012 | Carapelli et al. |
| 2013/0044003 A1 | 2/2013 | Eguro et al. |
| 2013/0055416 A1 | 2/2013 | Ma et al. |
| 2013/0104252 A1 | 4/2013 | Yanamadala et al. |
| 2013/0111227 A1 | 5/2013 | Sauerwein, Jr. |
| 2014/0002239 A1 | 1/2014 | Rayner |
| 2014/0049887 A1 | 2/2014 | Salle |
| 2014/0070006 A1 | 3/2014 | Weldele et al. |
| 2014/0081874 A1 | 3/2014 | Lewis et al. |
| 2014/0124576 A1 | 5/2014 | Zhou et al. |
| 2014/0204529 A1 | 7/2014 | White et al. |
| 2014/0211336 A1 | 7/2014 | Liao et al. |
| 2015/0006376 A1* | 1/2015 | Nuthulapati ......... G06Q 20/321 705/41 |
| 2015/0224892 A1 | 8/2015 | Callicoat et al. |
| 2015/0254961 A1 | 9/2015 | Brandl |
| 2016/0356666 A1* | 12/2016 | Bilal .................. G01M 3/2815 |
| 2017/0104325 A1 | 4/2017 | Eriksen et al. |
| 2017/0324195 A1 | 11/2017 | Eriksen et al. |
| 2019/0147197 A1 | 5/2019 | Razaghi |
| 2021/0216669 A1 | 7/2021 | Razaghi |

FOREIGN PATENT DOCUMENTS

| | | |
|---|---|---|
| DE | 103 40 289 A1 | 3/2005 |
| DE | 10 2005 015357 A1 | 10/2006 |
| DE | 10 2006 039136 A1 | 3/2007 |
| DE | 10-2009-0026466 B3 | 7/2010 |
| DE | 10-2010-0040942 A1 | 3/2012 |
| DE | 10-2012-0203474 A1 | 9/2013 |
| EP | 3668298 A1 | 6/2020 |
| KR | 10-2008-0105500 A | 12/2008 |
| WO | 2004/086202 A1 | 10/2004 |
| WO | 2015/050746 A1 | 4/2015 |

OTHER PUBLICATIONS

Office Action for European Patent Application No. 20156257.6, dated May 5, 2021.

Balaban, D., "Google's Schmidt Predicts Contactless Terminal Rollout," NFC Times, published Jun. 23, 2011, Retrieved from the Internet URL: http://www.nfctimes.com/news/google-s-schmidt-predicts-contactless-terminal-rollout, on Aug. 25, 2015, pp. 1-4.

Non-Final Office Action dated Feb. 24, 2015 for U.S. Appl. No. 14/296,310, of Wade, J., et al. filed Jun. 4, 2014.

Notice of Allowance dated Jul. 29, 2015 for U.S. Appl. No. 14/296,310, of Wade, J., et al. filed Jun. 4, 2014.

Non-Final Office Action dated Nov. 13, 2015, for U.S. Appl. No. 14/046,791, of Wade, J., et al., filed Oct. 4, 2013.

Non Final Office Action dated Dec. 31, 2015, for U.S. Appl. No. 14/285,438, of Wade, J., filed May 22, 2014.

Notice of Allowance dated Jan. 20, 2016, for U.S. Appl. No. 14/046,791, of Wade, J., et al., filed Oct. 4, 2013.

Non-Final Office Action dated Jan. 25, 2016 for U.S. Appl. No. 14/927,284, of Wade, J., et al. filed Oct. 29, 2015.

Notice of Allowance dated May 31, 2016 for U.S. Appl. No. 14/927,284, of Wade, J., et al. filed Oct. 29, 2015.

Final Office Action dated Jun. 6, 2016, for U.S. Appl. No. 14/285,438, of Wade, J., filed May 22, 2014.

Advisory Action dated Aug. 18, 2016, for U.S. Appl. No. 14/285,438, of Wade, J., filed May 22, 2014.

Notice of Allowance dated Oct. 25, 2016, for U.S. Appl. No. 14/285,438, of Wade, J., filed May 22, 2014.

Non Final office Action dated Dec. 6, 2016, for U.S. Appl. No. 15/224,450, of Wade, J., et al. filed Jul. 29, 2016.

First Examination Report for Australian Patent Application No. 2014329851, dated Dec. 15, 2016.

Non-Final Office Action dated Dec. 29, 2016, for U.S. Appl. No. 15/250,446, of Razaghi, M., filed Aug. 29, 2016.

(56) References Cited

OTHER PUBLICATIONS

Non Final Office Action dated Jan. 20, 2017, for U.S. Appl. No. 14/184,636, of Wade, J., et al., filed Feb. 19, 2014.
Notice of Acceptance for Australian Patent Application No. 2014329851, dated Mar. 6, 2017.
Notice of Allowance dated Apr. 13, 2017, for U.S. Appl. No. 15/250,446, of Razaghi, M., filed Aug. 29, 2016.
Final office Action dated May 8, 2017, for U.S. Appl. No. 15/224,450, of Wade, J., et al. filed Jul. 29, 2016.
Final Office Action dated Aug. 2, 2017, for U.S. Appl. No. 14/184,636, of Wade, J., et al., filed Feb. 19, 2014.
Notice of Allowance dated Aug. 24, 2017, for U.S. Appl. No. 15/224,450, of Wade, J., et al. filed Jul. 29, 2016.
Advisory Action dated Oct. 26, 2017, for U.S. Appl. No. 14/184,636, of Wade, J., et al., filed Feb. 19, 2014.
Non Final office Action dated Feb. 23, 2018, for U.S. Appl. No. 15/250,460, of Razaghi, M., filed Aug. 29, 2016.
Non Final Office Action dated May 11, 2018, for U.S. Appl. No. 15/250,468, of Razaghi, M., filed Aug. 29, 2016.
Non Final Rejection dated Jul. 13, 2018, for U.S. Appl. No. 15/281,707, of Razaghi, M., et al., filed Sep. 30, 2016.
Office Action for European Patent Application No. 14 850 478.0, dated Aug. 30, 2018.
Notice of Allowance dated Sep. 13, 2018, for U.S. Appl. No. 15/250,468, of Razaghi, M., filed Aug. 29, 2016.
Non Final Office Action dated Oct. 5, 2018, for U.S. Appl. No. 14/184,636, of Wade, J., et al., filed Feb. 19, 2014.
Notice of Allowance dated Dec. 3, 2018, for U.S. Appl. No. 15/250,460, of Razaghi, M., filed Aug. 29, 2016.
Corrected Notice of Allowance dated Dec. 28, 2018, for U.S. Appl. No. 15/250,468, of Razaghi, M., filed Aug. 29, 2016.
Final Office Action dated Feb. 1, 2019, for U.S. Appl. No. 15/281,707, of Razaghi, M., et al., filed Sep. 30, 2016.
Advisory Action dated Apr. 25, 2019, for U.S. Appl. No. 15/281,707, of Razaghi, M., et al., filed Sep. 30, 2016.
Non Final Office Action dated May 15, 2019, for U.S. Appl. No. 15/281,707, of Razaghi, M., et al., filed Sep. 30, 2016.
Final Office Action dated May 23, 2019, for U.S. Appl. No. 14/184,636, of Wade, J., et al., filed Feb. 19, 2014.
Notice of Allowance dated Jul. 19, 2019, for U.S. Appl. No. 15/581,871 of Hafemann, S., et al. filed Apr. 28, 2017.
Advisory Action dated Jul. 23, 2019, for U.S. Appl. No. 14/184,636, of Wade, J., et al., filed Feb. 19, 2014.
International Search Report and Written Opinion for International Application No. PCT/US2014/057044, dated Dec. 19, 2014.
Extended European Search Report for European Patent Application No. 14850478.0, dated May 16, 2017.
Notice of Allowance dated Oct. 23, 2019, for U.S. Appl. No. 15/281,707, of Razaghi, M., et al., filed Sep. 30, 2016.
Decision to grant for European Patent Application No. 14850478.0, dated Jan. 16, 2020.
Non-Final Office Action dated Oct. 1, 2020, for U.S. Appl. No. 16/248,980, of Razaghi, M., et al., filed Jan. 16, 2019.
Notice of Allowance dated Dec. 14, 2020, for U.S. Appl. No. 16/248,980, of Razaghi, M., et al., filed Jan. 16, 2019.
Non Final Office Action dated Jun. 24, 2021, for U.S. Appl. No. 16/577,639, of Razaghi, M., et al., filed Sep. 30, 2016.
Office Action for European Patent Application No. 20156257.6, dated Nov. 9, 2021.
Final Office Action dated Dec. 29, 2021, for U.S. Appl. No. 16/577,639, of Razaghi, M., et al., filed Sep. 30, 2016.

* cited by examiner

FIG. 5 ated by:"
TAMPER DETECTION USING ITO TOUCH SCREEN TRACES

CROSS-REFERENCE TO RELATED APPLICATIONS

This application claims priority to and is a divisional of U.S. patent application Ser. No. 15/581,871, filed on Apr. 28, 2017, entitled "TAMPER DETECTION USING ITO TOUCH SCREEN TRACES," the entirety of which is herein incorporated by reference.

BACKGROUND

1. Technical Field

The subject application relates to detection of tampering with a device having a touch screen and in particular, to a device having traces that form a conductive grid on the touch screen, to detect whether the touch screen or the associated device has been tampered with.

2. Introduction

Many prevailing electronic devices have a touch screen through which various forms of input are received. Such inputs can be provided, for example, through a human touch on the touch screen or via a stylus.

These electronic devices are susceptible to malicious surveillance in order to extract sensitive user information such as passwords and PINs. For example, the device may be physically tampered with in order to install a bug to skim information of interest.

Various methods exist for combating and preventing such tampering with electronic devices. For example, one method is to use a scrambler integrated circuit (IC) to shuffle up the touch data and make it difficult to skim information such as user passwords and PINs. Another method, is to detect tampering with hardware in the device by providing a security mesh grid inside a printed circuit board (PCB) to prevent drilling/cutting through the electronic device's circuitry to plant bugs or skim information. When the security mesh grid is broken, the electronic device self-destructs (disables itself).

Both methods described above require additional modifications to the hardware in electronic devices and/or additional logic/processing for scrambling the input information in order to make it difficult for the information to be retrieved by unauthorized parties.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

As described above, electronic devices that include a touch display component are susceptible to malicious surveillance in an attempt to extract sensitive user information such as passwords and personal identification numbers ("PINs"). One particular example of such electronic devices is a point of sale ("POS") device that includes various components, including but not limited to, a touch display (acting as a processing component for the POS device, which may hereinafter be referred to as display screen), a card reader (which may also be referred to as a transaction object reader), a network connection interface and a printer. While a POS device is described herein as one particular type of electronic device having a touch display component, the present disclosure is not limited to only a POS device and may be applicable to any other type of electronic device having a touch display component (hereinafter, such electronic devices may be referred to as touch based devices).

The subject technology relates to a touch based device configured to detect any tampering (e.g., a physical tampering) with the touch display component using the same traces of a conductive grid used to drive the touch display component for displaying information and/or receiving input.

Figure 1:
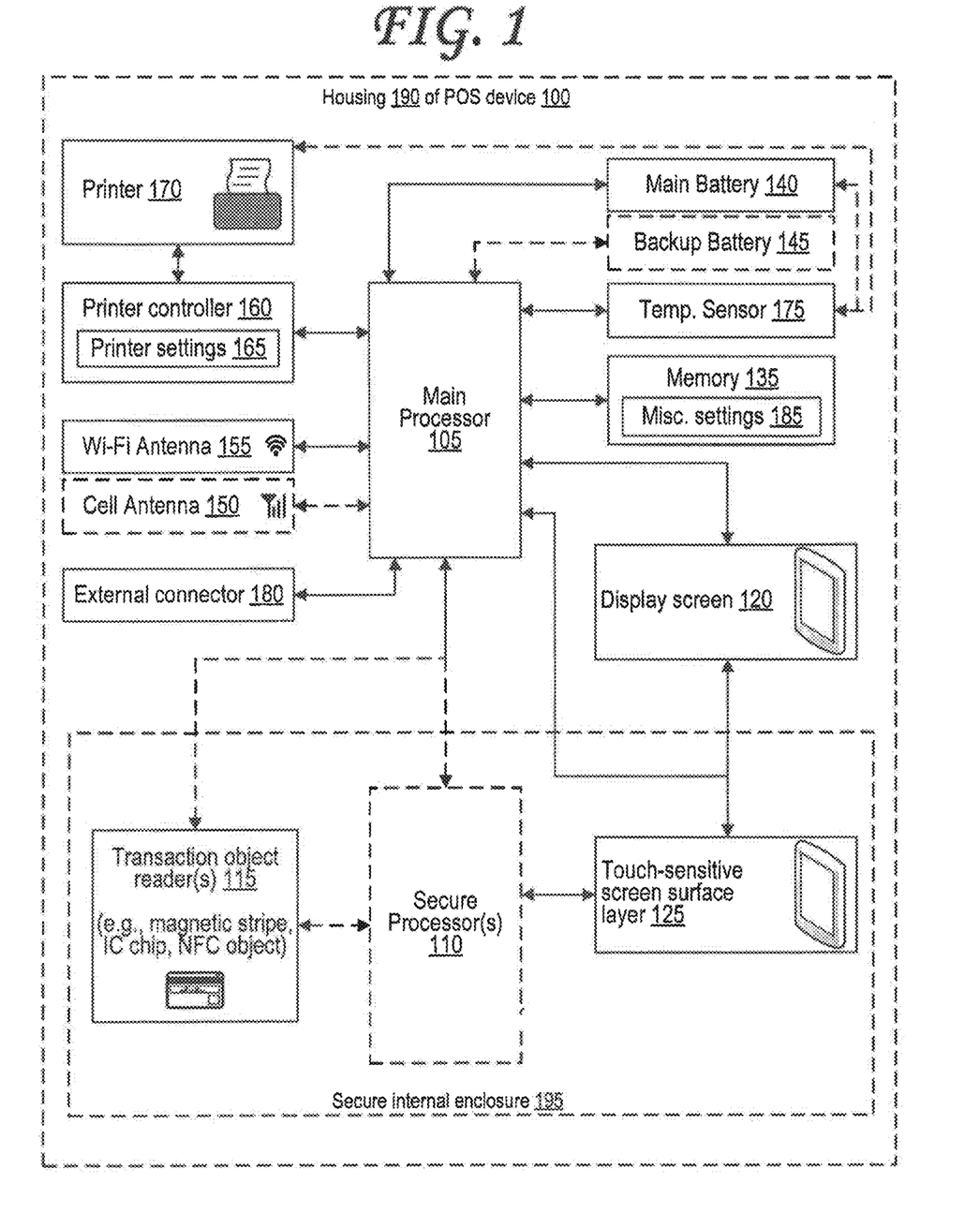
FIG. 1 is an architecture diagram of a point-of-sale (POS) device according to an aspect of the present disclosure.

FIG. 1 is an architecture diagram of a point-of-sale (POS) device with power management, according to an aspect of the present disclosure. The architecture diagram of the POS device 100 of FIG. 1 includes a main processor 105 in a housing 190, and optionally one or more secure processor(s) 110 within a secure internal enclosure 195 within the housing 190. Main processor 105 may execute instructions to perform a variety of tasks, which may include communicating with the one or more secure processor(s) 110 as well as communicating with and/or controlling the various components coupled directly or indirectly to the main processor 105.

The main processor 105 is coupled to a main battery 140 and optionally a backup battery 145 in FIG. 1. In some cases, the main battery 140 can be rechargeable, while the backup battery 145 can be non-rechargeable. Ultimately, however, either or both of the batteries can be rechargeable or non-rechargeable. The main processor 105, main battery 140, and/or backup battery 145 can also be connected to a power connector (not pictured) that can be connected to an external battery (not pictured), an external generator (not pictured), or a power outlet (not pictured). The power connector can be used to recharge main battery 140 and/or backup battery 145. The power connector can also be used to directly power processor 105 and all other components of POS device 100, even if both main battery 140 and backup battery 145 are missing.

In one example, main processor 105 is coupled to a printer 170 via a printer controller 160. Printer 170 can be used to print receipts, coupons, barcodes, quick-response ("QR") codes, or some combination thereof. Printer 170 may be a thermal printer, a direct thermal printer, a thermal transfer thermal printer, a solid-ink "phaser" printer, an inkjet printer, a thermal inkjet ("bubblejet") printer, a continuous inkjet printer, a piezoelectric inkjet printer, a dye-sublimation printer, a laser printer, an LED printer, or some combination thereof. Printer controller 160 may include a memory and/or a processor, microcontroller or ASIC (application specific integrated controller) with which it may adjust various printer setting values assigned to various printer settings 165 to control various aspects of the how printer 170 prints. Various exemplary printer settings 165 and corresponding possible printer setting values that are known, or to be developed, are within the scope of the present disclosure and may be utilized by printer 170. In some cases, printer controller 160 need not be a separate component from main processor 105, and the functions of printer controller 160 may simply be performed by main processor 105. In that light, it should be understood that any actions described herein as being performed by printer controller 160 can alternately or additionally be performed by main processor 105, and vice versa.

In one example, main processor 105 is coupled to a temperature sensor 175 in FIG. 1. Temperature sensor 175 can optionally include one or more thermistors, and can optionally be connected to main battery 140 and/or to printer 170. The temperature sensor may include one or more of a Negative Temperature Coefficient (NTC) thermistor, a Resistance Temperature Detector (RTD), a resistance thermometer, a thermocouple, an infrared sensor, a bimetallic device, a thermometer, a change-of-state sensor, a semiconductor-based temperature sensor, a silicon diode or other diode with temperature-sensitive voltage characteristics, or some combination thereof.

Figure 5:
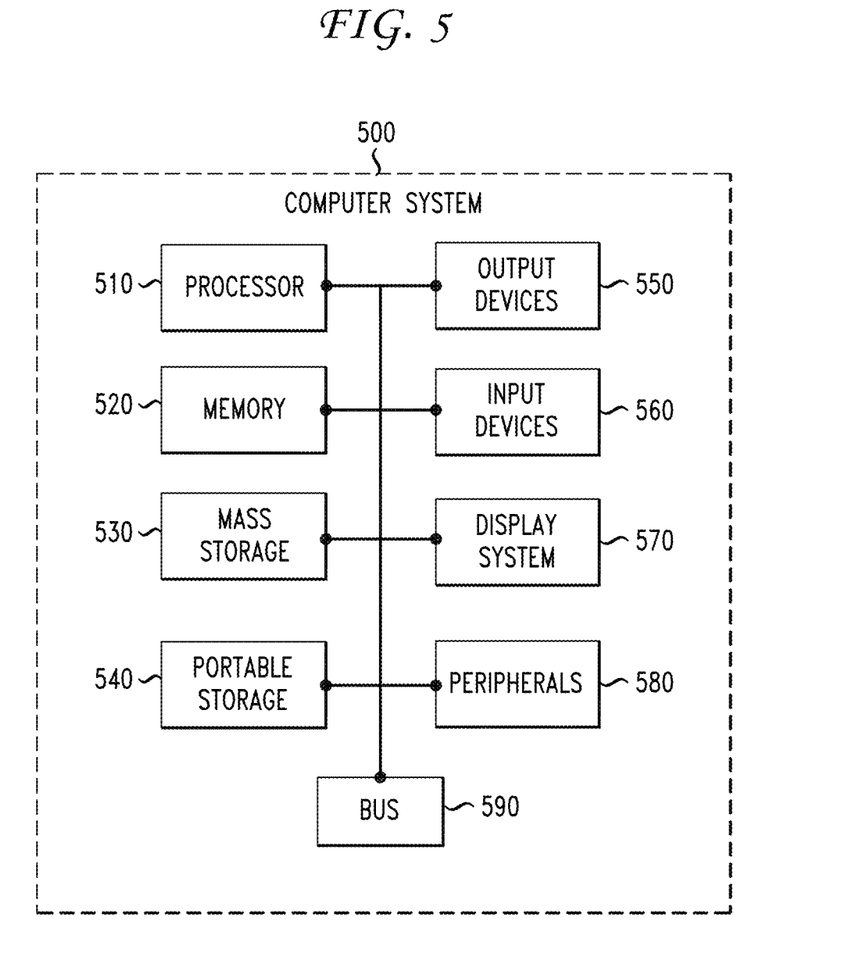
FIG. 5 illustrates an exemplary computing system to implement the POS device of FIG. 1, according to an aspect of the present disclosure.

Main processor 105 can be connected to one or more antennas, including an 802.11 Wi-Fi antenna 155, a cellular phone network antenna 150, a Bluetooth® antenna, a Bluetooth® Low Energy (BLE) antenna, any other antennae or communication means discussed with respect to the output devices 550 or input devices 560 of FIG. 5, or some combination thereof. The main processor 105 can alternately be connected to other means to networking, such as a wired Ethernet port.

Main processor 105 can be any type of processor 510 identified with respect to FIG. 5, and may be in some cases be part of, or include, an application-specific integrated circuit (ASIC). While main processor 105 and secure processor(s) 110 are illustrated as separate components in FIG. 1, main processor 105 and secure processor(s) 110 can in some cases be combined into a single component. It should be understood that any actions described herein as being performed by secure processor(s) 110 can alternately or additionally be performed by main processor 105, and that that any actions described herein as being performed by main processor 105 can alternately or additionally be performed by secure processor(s) 110.

POS device 100 can further include a touch-sensitive screen surface layer 125 corresponding to the display screen 120, which can enable the display screen 120 to act as a touchscreen for receiving commands and inputs from a user of POS device 100 (e.g., a touch input provided via a finger, a stylus, etc.). Because information entered via the touch-sensitive screen surface layer 125 may include sensitive information, such as PIN codes or handwritten signatures entered via touch-sensitive surface, circuitry reading inputs of touch-sensitive surface layer 125 may in some cases be housed in secure internal enclosure 195, while the circuitry of display screen 120 of the touchscreen 210 might not be. Likewise, POS device 100 may include other input devices 560 as will be discussed below with respect to FIG. 5, such as physical keypads, whose circuitry might also be located in secure internal enclosure 195 for the same reasons. Touch-sensitive screen surface layer 125 may use any type of display discussed in reference to the display system 570 of FIG. 5, and may use capacitive touch sensing, resistive touch sensing, inductive touch sensing, or some combination thereof. For example, touch-sensitive screen surface layer 125 may utilize a Indium Tin Oxide (ITO) touch-sensitive layer or a printed ink touch-sensitive layer.

Secure processor(s) 110 are also connected to one or more transaction object reader(s) 115. Transaction object reader(s) 115 can include a magnetic stripe reader 235, an integrated circuit (IC) chip reader 225, a near field communication (NFC) reader, or some combination thereof. Magnetic stripe reader 235 reads transaction data from a magnetic stripe of a transaction object. The IC chip reader 225 reads transaction data from an IC chip of a transaction object. The IC chip can be a chip following Europay/Mastercard/Visa ("EMV") standards, also known as an EMV chip. NFC reader reads transaction data from wireless NFC signals received from a transaction object. The transaction object may be a transaction card, such as a credit card or a debit card. The transaction object can be any type of NFC-capable device, such as an active NFC tag, a passive NFC tag, etc. In some cases, multiple transaction object readers 115 may share components—for example, IC chip reader 225 and NFC reader can share a contactless antenna. Once transaction object reader(s) 115 retrieve the transaction data from the transaction object, transaction object reader(s) 115 send the transaction data to the secure processor(s) 110 and/or main processor 105. Transaction object reader(s) 115 and/or secure processor(s) 110 sometimes modify or encrypt the transaction data using an encryption key stored in a memory (not pictured) associated with transaction object reader(s) 115 and/or secure processor(s) 110 before sending it to main processor 105.

Main processor 105 may also be connected to a memory 135 that stores various instructions to be executed by the main processor, such as instructions corresponding to a financial transaction software application allowing main processor 105 to receive transaction data from read by transaction object reader(s) 115, optionally via secure processor(s) 110, and to transmit that data to one or more financial transaction processing server(s), such as credit or debit card processing server(s) and/or bank server(s), thereby conducting a financial transaction between a merchant and a buyer whose transaction information was read via transaction object reader(s) 115. Memory 135 can also store printer settings 165 additionally or alternatively from printer controller 160. Memory 135 can also store miscellaneous settings 185 pertaining to the main processor 105, display screen 120, touch-sensitive screen surface layer 125, Wi-Fi antenna 155, cellular antenna 150, and/or various other components. Various exemplary miscellaneous settings 185 and corresponding possible miscellaneous setting values are identified in FIG. 5.

Main processor 105 can also be connected to at least one external connector 180, which may be an externally-facing female port or male plug that can allow POS device 100 to connect to other devices or power sources. In some cases, external connector 180 can allow POS device 100 to connect to any other computer system 500, or to any device including at least a subset of the components identified in FIG. 5 or discussed in its description. POS device 100 can be connected to one or more peripheral devices or hubs via at least one external connector 180. POS device 100 can in some cases act as a peripheral device to a host device connected via at least one external connector 180. In some cases, external connector 180 can function as the power connector discussed above with respect to the batteries 140/145 and/or external power sources. In some cases, external connector 180 can be a universal serial bus (USB) port/plug using any USB standard, including USB Type-A, USB Type-B, USB Type-C, USB 1.x, USB 2.x, USB 3.x, USB 4.x, Thunderbolt, USB mini, USB micro, USB On-The-Go (OTG), any other USB standard, or some combination thereof. In other cases, external connector 180 can be an Apple® Lightning® port/plug, an Ethernet port/plug, a fiber optic port/plug, a proprietary wired port/plug. In other cases, external connector 180 can be a wireless transceiver, such as one supporting a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof.

POS device 100 can also include various additional or alternative elements connected to main processor 105 and/or secure processor(s) 110, each of which may optionally be located in secure internal enclosure 195. Such additional or alternative elements may include microphones. The additional or alternative elements may include cameras, such as visible light cameras, infrared cameras, ultraviolet cameras, night vision cameras, or even ambient light sensors. Ambient light sensors may optionally be coupled to main processor 105 and/or display screen 120 to control brightness of display screen 120 and/or of a backlight of display screen 120 in order to acclimatize to the ambient light level around POS device 100 and prevent display screen 120 from appearing too bright/harsh or too dim/unclear. The additional or alternative elements may include biometric sensors, such as fingerprint scanners, handprint scanners, voice authentication, facial recognition or iris scanners (using any of the camera types discussed above), blood testers, DNA testers, or some combination thereof. The processor(s) 105/110 may compare received biometric data from the buyer via the biometric sensors against databases stored within memory 135 or accessible to the POS device 100 via a network connection via the Internet or a private network. The additional or alternative elements may include one or more accelerometer(s) and/or one or more gyroscope(s), allowing the processor(s) 105/110 of POS device 100 to react to being tilted, moved, or shaken. The additional or alternative elements may include one or more indicator lights, which may be light-emitting diodes (LED) and may emit light, optionally at varying brightness levels and/or colors, to indicate a successful transaction, to indicate a failed transaction, to indicate that a card or other transaction object should be presented/inserted/swiped, to indicate that a card or other transaction object should be removed, to indicate that a user input such as a PIN code must be input via the touch-sensitive display screen 210, to indicate that an input via touch-sensitive display screen 120 has been received, to indicate successful connection via any of the antennae of POS system 100, to indicate failure to connect via any of the antennae of POS system 100, to indicate a signal strength associated with any of the antennae of POS system 100, or some combination thereof. The additional or alternative elements may include any components illustrated in FIG. 5 or discussed in the description of FIG. 5.

In one example, display screen 120 can be standalone electronic device such as a tablet, a mobile device, a laptop, a computer, a personal digital assistant, etc.

While a specific example of POS device 100 includes various components described above such as display screen 120, transaction object reader 115 and printer 170, the present disclosure is not limited thereto. For example, device 100 may not be a POS device but can instead be any other electronic device having a touch display component (such as a standalone mobile device, tablet, laptop, etc.). Furthermore, device 100 (or the POS device 100) can include any other component coupled to the components described above with reference to FIG. 1. For example, POS device 100 may have a stylus associated therewith for inputting information into POS device 100 through display screen 120.

Figure 2:
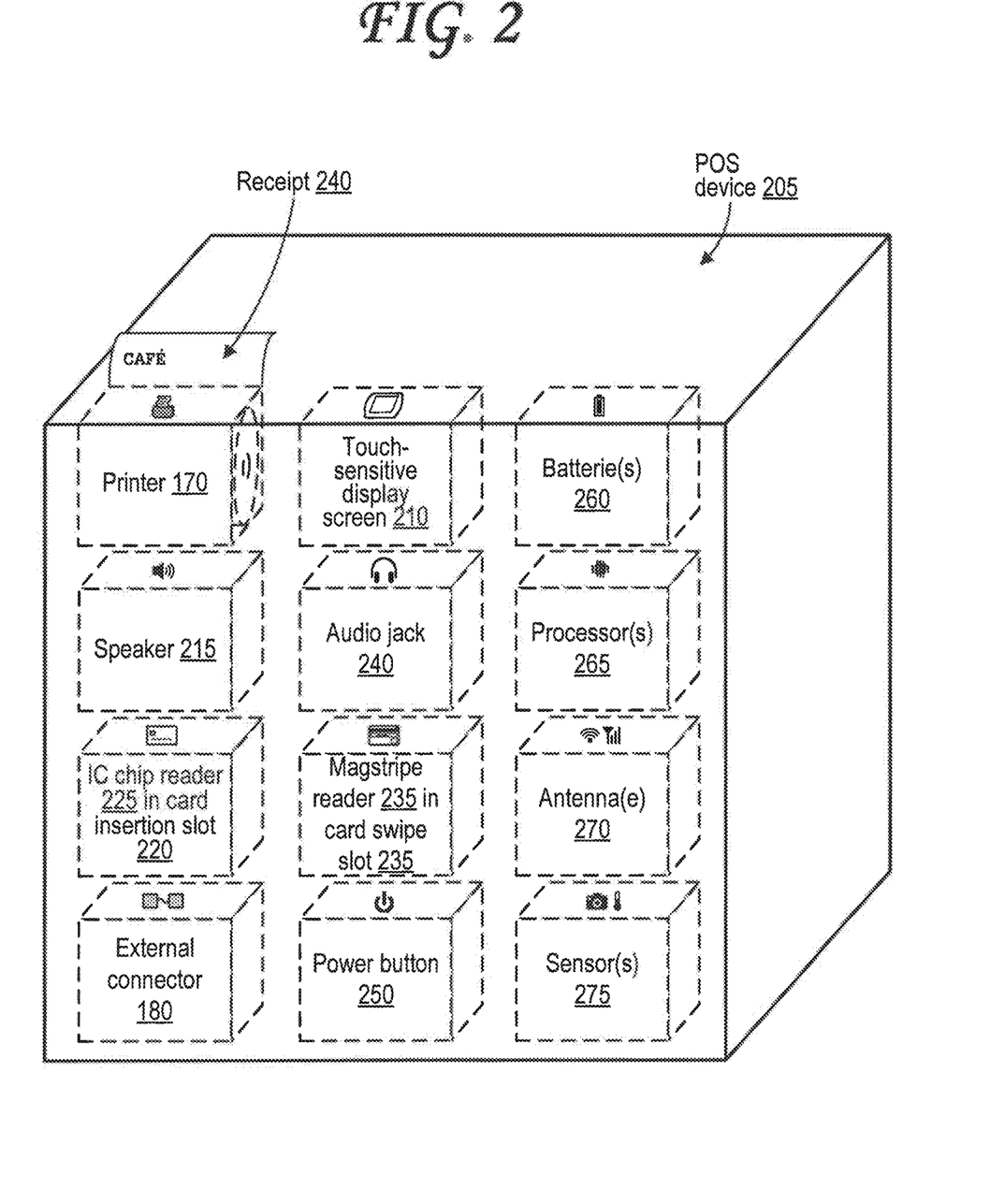
FIG. 2 illustrates components of a point-of-sale (POS) device of FIG. 1, according to an aspect of the present disclosure.

FIG. 2 illustrates components of a point-of-sale (POS) device of FIG. 1, according to an aspect of the present disclosure.

POS device 205 of FIG. 2 is the same as POS device 100 of FIG. 1 and includes at least a subset of the architecture and components illustrated in FIG. 1 and optionally may include at least a subset of the circuitry illustrated in FIG. 5 or discussed with respect to FIG. 5.

POS device 205 of FIG. 2 may include one or more batteries 260, which may include one or more rechargeable batteries, one or more non-rechargeable batteries, or some combination thereof. In some cases, one battery may act as a "main" battery, while another acts as a "backup" battery and serves to provide power to complete a transaction that was started using power from the main battery if the main battery becomes depleted or stops working due to a disconnected/poor electrical connection, a short circuit, or a battery defect.

Two transaction object readers 115 and corresponding card slot interfaces are depicted in the POS device 205 of FIG. 2. In particular, a card insertion slot 220 is included in POS device 205, allowing insertion of an IC chip card having an IC chip, such as an EMV chip. Transaction information is read from this IC chip by the IC chip reader 225 and then transmitted on to processor 105, optionally being encrypted at the transaction object (the IC chip card), at IC chip reader 225, at secure processor(s) 110, at processor 105, or some combination thereof. A card swipe slot 230 is depicted, through which a magnetic stripe card having a magnetic stripe may be swiped. In some cases one or more "swiper walls" may be included along the sides of card swipe slot 230 to keep the card in card swipe slot 230 for the duration of the swipe. Transaction information is read from this magnetic stripe by magnetic stripe reader 235 and then transmitted on to processor 105, optionally being encrypted at the transaction object (the magnetic stripe card), at the magnetic stripe reader 235, at secure processor(s) 110, at processor 105, or some combination thereof. An NFC antenna may also be included within POS device 205, though it is not shown. Transaction information is read from an NFC-capable object by the NFC antenna and then transmitted on to processor 105, optionally being encrypted at the transaction object (the NFC-capable object), at the NFC antenna, at secure processor(s) 110, at the processor 105, or some combination thereof. In some cases, the NFC antenna and IC chip reader 225 may share a contactless antenna.

POS device 205 of FIG. 2 may include one or more processor(s) 265, including the processor 105 and/or secure processor(s) 110, depicted in FIG. 1. Each of the one or more processor(s) 265 may be any type of processor 510 discussed with respect to FIG. 5. Each of the one or more processor(s) 265 may be connected to its own memory 520, mass storage 530, portable storage 540, output devices 550, input devices 560, or any other component discussed with respect to FIG. 5. Alternately, some of one or more processor(s) 265 may share such components.

In some cases, POS device 205 may include one or more secondary processor(s) in addition to processor 105, for example to distribute different processes or control of different components to different processors. These secondary processor(s) may include secure processor(s) that are connected to the transaction object reader(s) 115 (e.g., secure processor(s) 110), where the secure processor(s) handle encryption of the transaction information before that transaction information reaches the main processor 105. These secure processor(s), along with components of transaction object reader(s) 115, may be housed in a secure enclosure within POS device 205 (such as secure internal disclosure 195 described with reference to FIG. 1), where the secure enclosure may include tamper detection circuitry that may be connected to the secure processor(s) and/or to main processor 105. The tamper detection circuitry, which will be further described below, may be the same as the circuitry of touch-sensitive screen surface layer 125 shown in FIG. 1, so that any break in the traces (e.g., ITO traces), or any short circuit caused by connecting two ITO traces, can be detected. In this way, one or more processor(s) 265, can detect if someone has attempted to tamper with the secure enclosure, for example by attempting to open the secure enclosure, by drilling into a side of the secure enclosure, by attempting to damage or disable the secure enclosure, or by flooding the secure enclosure with a conductive fluid. Some input components that may receive sensitive information such as Personal Identification Number (PIN) codes, signatures, or biometric data may also be enclosed in secure internal enclosure 195, may be any memory or data storage components that store symmetric or asymmetric encryption/decryption security keys for encrypting and/or decrypting transaction information. These input components may include touch-sensitive layer components of touch-sensitive display screen 210 (which may be the combination of display screen 120 and touch-sensitive screen surface layer 125), biometric sensors, or a physical keypad.

It should be understood that any operation discussed herein as being performed by the processor 105 can alternately or additionally be performed by any combination of the one or more processor(s) 265, such as the secure processor(s) 110 discussed above.

A touch-sensitive display screen 210 is illustrated on a forward-tilted top face of POS device 205. The touch-sensitive display screen 210 may be connected to processor 105 and optionally to secure processor(s) 110, and may display, for example, a user interface of a financial transaction application run via processor 105 by executing financial transaction application instructions stored in a memory of POS device 205. Touch-sensitive display screen 210 may use any type of display discussed in reference to display system 570 of FIG. 5, and may use capacitive touch sensing, resistive touch sensing, inductive touch sensing, or some combination thereof. For example, touch-sensitive display screen 210 may utilize a Indium Tin Oxide (ITO) touch-sensitive layer or a printed ink touch-sensitive layer as the touch-sensitive screen surface layer 125.

A receipt 240 is illustrated being output of a top-rear edge of POS device 205. This receipt 240 is output by a printer 180 illustrated FIG. 2.

POS device 205 also includes a speaker 215 for outputting audio. Such audio can be associated with the financial transaction application, and can for example be output to indicate a successful transaction, to indicate a failed transaction, to indicate that a card or other transaction object should be presented/inserted/swiped, to indicate that a card or other transaction object should be removed, to indicate that a user input such as a PIN code must be input via touch-sensitive display screen 210, to indicate that an input via touch-sensitive display screen 210 has been received, or some combination thereof.

The perspective view of POS device 205 illustrates printer 180 in the rear of POS device 105, where printer 180 is printing receipt 240 that is also visible in FIG. 2. A roll of paper is visible through an open rear face of POS device 105 in FIG. 2. The paper may be thermal paper, contact paper, photo paper, or other specialized paper as required by printer 180. In some cases, one or more face(s) of POS device 105 may include doors (not shown) that open and close, for example enabling paper, ink, and/or toner to be easily replaced in printer 180, or enabling one or more batterie(s) 260 to be easily replaced.

The perspective view of POS device 205 also shows an external connector 180, namely a USB type-C port. POS device 205 may also or alternatively include at least one of a Bluetooth®, Bluetooth® Low Energy (BLE), or Wi-Fi antenna internally to serve as external connectors 180.

The perspective view of POS device 205 also shows an audio jack 240. Audio jack 240 may allow headphones or external speakers to be plugged into POS device 205 to provide an alternative or additional audio output device to output the audio that speakers 215 can output. Other peripherals, such as card readers or NFC readers, may alternatively be connected via audio jack 240. Audio jack 240 may in some cases act as an external connector 180.

POS device 205 may also include a power button 250 that can be used to control a supply of power to processor 105, touch-sensitive display screen 210, transaction object reader(s) 115, and/or other elements of POS device 205. POS device 205 may be powered by batterie(s) 260 discussed above, a connection to a power outlet, or some combination thereof. The connection to the power outlet or other power source may be made through the external connector 180 or a separate power port (not illustrated), and may charge batterie(s) 260 and/or power at least a subset of the components of POS device 205.

The POS device 205 may include one or more wireless antennae 270, which may include antenna 155 and/or antenna 150 described above with reference to FIG. 1. The one or more wireless antennae 270 may include, for example, a 802.11 Wi-Fi antenna, a Bluetooth® antenna, a Bluetooth® Low Energy (BLE) antenna, a cellular network antenna, a NFC antenna, a radio frequency identification (RFID) antenna, an antenna for any other type of communication discussed with respect to FIG. 5, or some combination thereof.

POS device 205 may include one or more sensors 275, whose measurements may be fed into processor 105 or any other processor(s) 265. Sensors 275 may include a temperature sensor for detecting high temperatures, which may indicate overheating and/or for detecting low temperatures, which may increase undervoltage risk, since batteries often do not function as well in low temperatures. Sensors 275 may include a camera (visible, infrared, ultraviolet, or some combination thereof) or ambient light sensor, which may for example be used to adjust the brightness and/or backlight brightness of touch-sensitive display screen 210 to match its surroundings, so that brightness is increased where surroundings are bright to improve visibility, and so that brightness is decreased where surroundings are dim to avoid eyestrain. Sensors 275 may include biometric sensors, such as fingerprint scanners, palm scanners, iris/facial recognition detection (using one or more cameras), voiceprint recognition (using one or more microphones), blood sensors, DNA sensors, or some combination thereof. Data from biometric sensors may be encrypted along with transaction information or separately, and may be verified (by POS device 205 or by a remote server) against a database stored at POS device 205 or at another remote device that can communicate (through wired and/or wireless communication schemes) with POS device 205.

POS device 205 may in some cases include additional ports or components not shown in the figures, such as an Ethernet port for wired networking capabilities, a SIM card slot and cellular antenna for cellular networking capabilities, or any other component illustrated in FIG. 5 or identified in the description of FIG. 5.

While POS device 205 has been described as including components shown in FIG. 2, the present disclosure is not limited thereto. POS device 205 can include any combination of one or more of the component shown in FIG. 2 in additional to additional ports or components described in the above paragraph.

Figure 3:
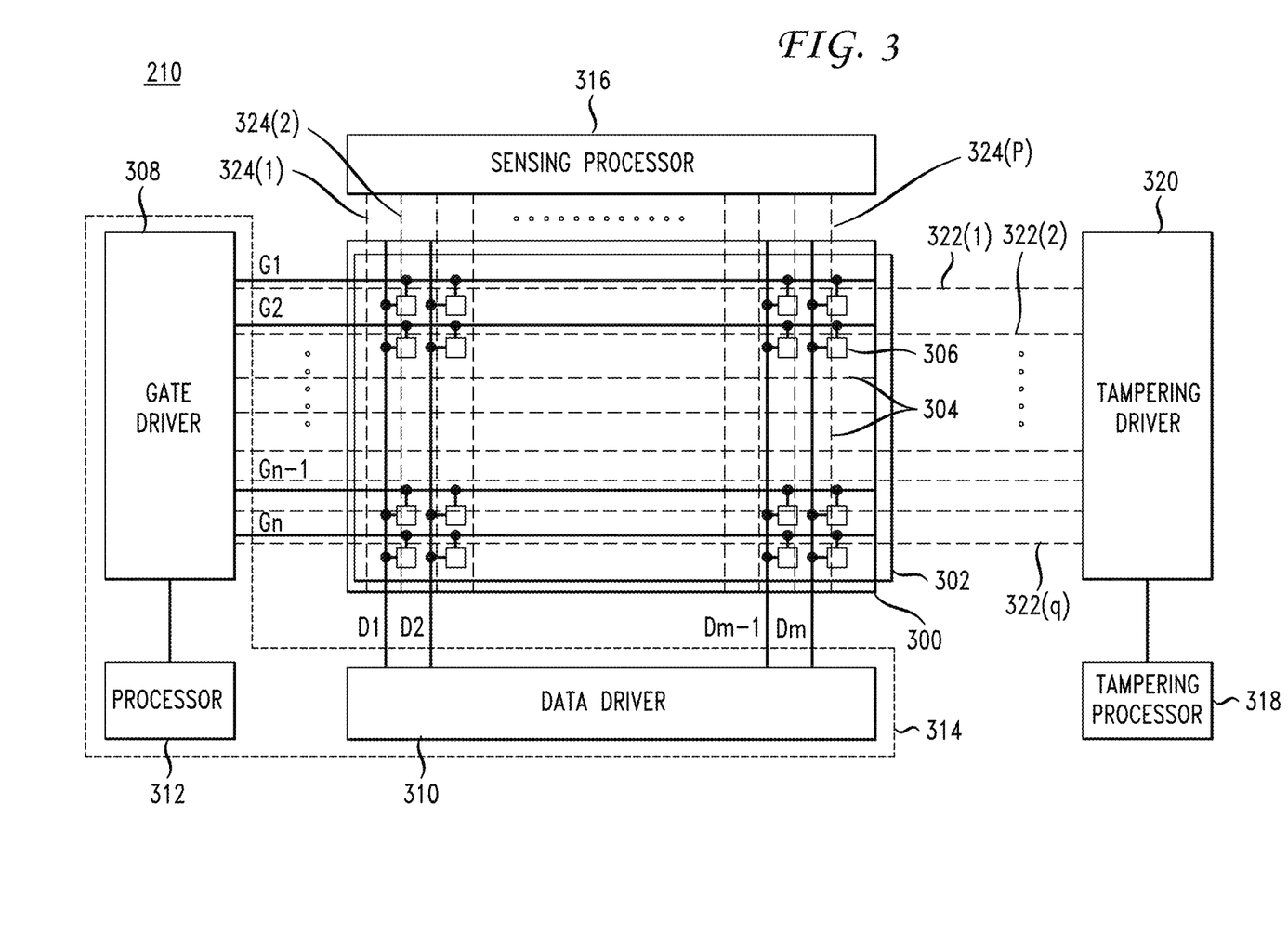
FIG. 3 illustrates a circuitry of touch sensitive display screen of FIG. 2, according to an aspect of the present disclosure.

FIG. 3 illustrates a circuitry of touch sensitive display screen of FIG. 2, according to an aspect of the present disclosure. Hereinafter, touch sensitive display screen 210 may also be referred to as touch display 210

Referring to FIG. 3, touch display 210 has a display 300. Display 300 can be formed of glass, plastic, etc. Display 300 can be a liquid crystal display (LCD), a light emitting diode (LED), organic LED (OLED), etc. Display 300 is coated with a transparent conductive layer 302. Transparent conductive layer 302 can be the same as touch-sensitive screen surface layer 125, described above with reference to FIG. 1. Transparent conductive layer 125 can be a conductive grid formed of a plurality of traces 304 that are made of Indium Tin Oxide (ITO) material, which may hereinafter be referred to as ITO traces 304. In one example and as shown in FIG. 3, ITO traces 304 are formed of horizontal ITO traces 322(1), 322(2) . . . , 322(q) and vertical ITO traces 324(1), 324(2), . . . , 324(p), with p and q being positive integers that are equal to or different from m and n, which are the number of gate lines and data lines. While examples are described according to which transparent conductive layer 302 is made of ITO material, the present disclosure is not limited thereto.

While in FIG. 3, transparent conductive layer 302 is shown to be offset with reference to display 300, this illustration is for purpose of showing that transparent conductive layer 302 if separate from display 300. Transparent conductive layer 302 can be the same size as display 300 covering an entire surface of display 300 or can have a different size covering more or less than the entirety of display 300.

Display 300 is formed of gate lines G1, G2, . . . , Gn and a plurality of data lines D1, D2, . . . , Dm, where m and n may have the same or different positive integer values. At an intersection of each of gate lines G1, G2, . . . , Gn and each of data lines D1, D2, . . . , Dm, a Thin Film Transistor (TFT) such as TFT 306 is formed. TFT 306 can be bipolar junction transistor (BJT), a metal oxide semiconductor field effect transistor (MOSFET) or any other known or to be developed TFT or transistor. Each TFT 306 at an intersection of one of gate lines G1, G2, . . . , Gn and one of data lines D1, D2, . . . , Dm, forms a pixel and may be referred to as pixel 306.

A gate of each TFT 306 is connected to one of gate lines G1, G2, . . . , Gn for purposes of supplying a voltage to each TFT 306 (e.g., 5V) in order to turn on each TFT 306. A source/collector of each TFT 306 is connected to one of data lines D1, D2, . . . , Dm. A supply of a voltage (e.g., 5V) to source/collector of each TFT 306 enables a process of displaying various colors, etc. in order to form and display an image on display 300, according to any known or to be developed method.

Plurality of gate lines G1, G2, . . . , Gn and plurality of data lines D1, D2, . . . , Dm are connected to gate driver 308 and data driver 310, respectively, for purposes of supplying/driving gate lines and data lines (e.g., sequentially driving gate lines and data lines) and ultimately TFTs 306, according to any known or to be developed method.

Processor 312 is provided and can communicate with gate driver 308 and data driver 310 to regulate (e.g., control the timing of) supplying of voltages by gate driver 308 and data driver 310 to plurality of gate lines G1, G2, . . . , Gn and plurality of data lines D1, D2, . . . , Dm, as well as detecting a location of a touch on display 300, etc.

While FIG. 3 illustrates that gate driver 308, data driver 310 and processor 312 are part of a single integrated circuit (IC) chip 314, present disclosure is not limited thereto. For example, gate driver 308, data driver 310 and processor 312 may be separate from one another. Alternatively, a single driver can perform functionalities of gate driver 308 and data driver 310.

As mentioned, transparent conductive layer 302 is formed of a grid of ITO traces 304. ITO traces 304 can be driven by gate driver 308 and/or data driver 310 for performing a sensing scan for detection of a touch on display 300. Alternatively, ITO traces 304 can have a separate driver (similar to gate driver 308 or data driver 310) for driving ITO traces 304 for performing a sensing scan. Circuitry of touch display 210 further includes a sensing circuit/processor 316 that is electrically coupled to ITO traces 304 for sensing a touch on display 300. In one example, processor 312 and sensing processor 316 can be electrically coupled in order to coordinate a timing of driving gate lines G1, G2, . . . , Gn, data lines D1, D2, . . . , Dm and ITO traces 304 for performing display and/or sensing functions. Alternatively, processor 312 may perform functionalities of sensing circuit/processor 316 for sensing and detecting a touch, according to known or to be developed methods.

Display 300 may be driven (refreshed) by gate driver 308, data driver 310 and processor 312, a certain number of times per second (depending on the underlying frequency, such as 60 Hz, 120 Hz, 240 Hz, etc.) in order to display underlying content. Each instance driving display 300 may be referred to as a single frame. In one example, processor 312, for each frame, drives TFTs 306 and ITO traces 304 of transparent conductive layer 302 such that a one or more portions (time segments) of each frame, gate driver 308 and data driver 310 drive TFTs 306 for displaying content while at one or more other portions (interleaved between each instance of driving TFTs 306 within a single frame) gate driver 308 and/or data driver 310 drive ITO traces 304 for performing a sensing scan for sensing a touch.

FIG. 3 further illustrates a tampering processor 318 and tampering driver 320. In one example and similar to IC chip 314, tampering processor 318 and tampering driver 320 can be provided as part of a single IC chip (not shown). Tampering processor 318 and tampering driver 320 are electrically coupled to ITO traces 304. As will be described below, the present disclosure provides that whenever ITO tracers 304 are not driven for purposes of performing a sensing scan for sensing a touch, tampering processor 318 together with tampering driver 320 drive ITO traces 304 to perform a security scan of the display 300 in order to determine whether touch display 210 has been tampered with (e.g., physically tampered) or not. The security scan may also be referred to as an electrical scanning of ITO traces 304 to detect any alteration in conductive properties of one or more of ITO traces 304.

In one example, tampering processor 318 can be electrically coupled to sensing processor 316 and/or processor 312 in order to coordinate a timing of driving gate lines G1, G2, . . . , Gn, data lines D1, D2, . . . , Dm and ITO traces 304 for performing display, sensing and/or security scan functions. In one example, the functionalities of tampering processor 318 may be incorporated into processor 312 (or sensing processor 316), while the functionalities of tampering driver 320 may be performed by gate driver 308 and/or data driver 310. Accordingly, processor 312 may further partition each frame such that for one or more portions of the each frame, TFTs 306 are driving for displaying content, for one or more portions of each frame, ITO traces 304 are driven to perform a sensing scan and for one or more portions of each frame, ITO traces 304 are driven to perform a security scan. Alternatively, ITO traces 304 may not be driven in each frame for purposes of performing a security scan. For example, processor 312 may include performance of security scans in every other frame or once every three frames, etc.

In one example, processor 312, sensing processor 316 and/or tampering processor 318 can be the same as main processor 105 and/or secure processor(s) 110 that is electrically connected to drive IC 304 (e.g., gate driver 306 and data driver 308 included therein) and tampering driver 320.

While examples of driving touch display 210 and sensing a touch input have been described with reference to FIG. 3, the present disclosure is not limited thereto. Accordingly, any known or to be developed method of driving touch display 210 for displaying content and sensing one or more touch inputs received on touch display 210 may be utilized. For example, infrared and/or optical sensing methods for sensing one or more touch inputs may be used.

Having described various examples of configuration of POS device 100 as well as a non-limiting example of operation of touch display 210, we now turn to a discussion of using the same ITO traces 304 used for sensing a touch on display 210 to determine whether touch display 210 (and ultimately POS device 100) has been tampered with. This would in turn eliminate the need for either providing additional logic to scramble any input (e.g., PINs, passwords, etc.) provided on touch display 210 and/or printing one or more security mesh on a printed circuit board that houses above-described components of POS device 100, in an attempt to detect a tampering of POS device 100 and disabling its operation upon such detection.

As described above, ITO traces 304 of touch display 210 are driven to sense a change in capacitance (or resistance or inductance or any combination thereof) at one or more locations on display 300 (to detect any alteration in electrical properties of the ITO traces 304), which would signal that a touch input is received at the one or more locations on display 300. This driving of ITO traces 304, as described above, involves periodic transmission of a given voltage to the plurality of gate lines in order to excite ITO traces 304 for providing a change in capacitance due to a touch. For example, sensing processor 316, as part of driving traces 322(1), . . . , 322(q), instructions gate driver 308 to drive ITO trace 322(1). While driving ITO trace 322(i), sensing processor 316 senses each of ITO traces 324(1), . . . , 324(p) and determines if a change in capacitance (or alternatively resistance or inductance or any combination thereof) is sensed at any of the intersections of 322(1) with 324(1), . . . , 324(p). The same process would be repeated for remaining one of ITO traces 322(2), . . . , 322(q). This process, depending on the frequency of the underlying clock signal may be repeated anywhere between a few times to a few hundred times per second (depending on a frequency of the clock signal generated by sensing processor 316). This process of traversing ITO traces 304 in order to sense a touch may be referred to as a touch scan, as mentioned above. A touch scan may also be referred to as an electrical scanning of ITO traces 304 to detect any alteration in electrical properties of ITO traces 304 due to the receiving of a touch input.

One aspect of the present disclosure is to use same ITO traces 304, whenever ITO traces 304 are not driven to perform a touch scan, and drive them in order to determine if touch display 210 has been tampered with, where the tampering may be physical. For example, touch display 210 may have been physically drilled into to plant a bug for skimming any type of information provided as input through touch display 210. Such physical intrusion, results in damage to one or more of ITO traces 304 such that the underlying electrical connection at a location of such physical intrusion is damaged and the corresponding pixel(s) no longer conduct electricity (because one or more of ITO traces 304 may have been broken as a result). In other words, conductive properties of one or more of the ITO traces 304 is altered due to the physical intrusion such that the one or more ITO traces 304 are no longer conducting electricity. The process of driving ITO traces 304 in order to determine whether touch display 210 (or more generally POS device 100) has been tampered with or not, may be referred to as a security scan, as mentioned above.

Figure 4:
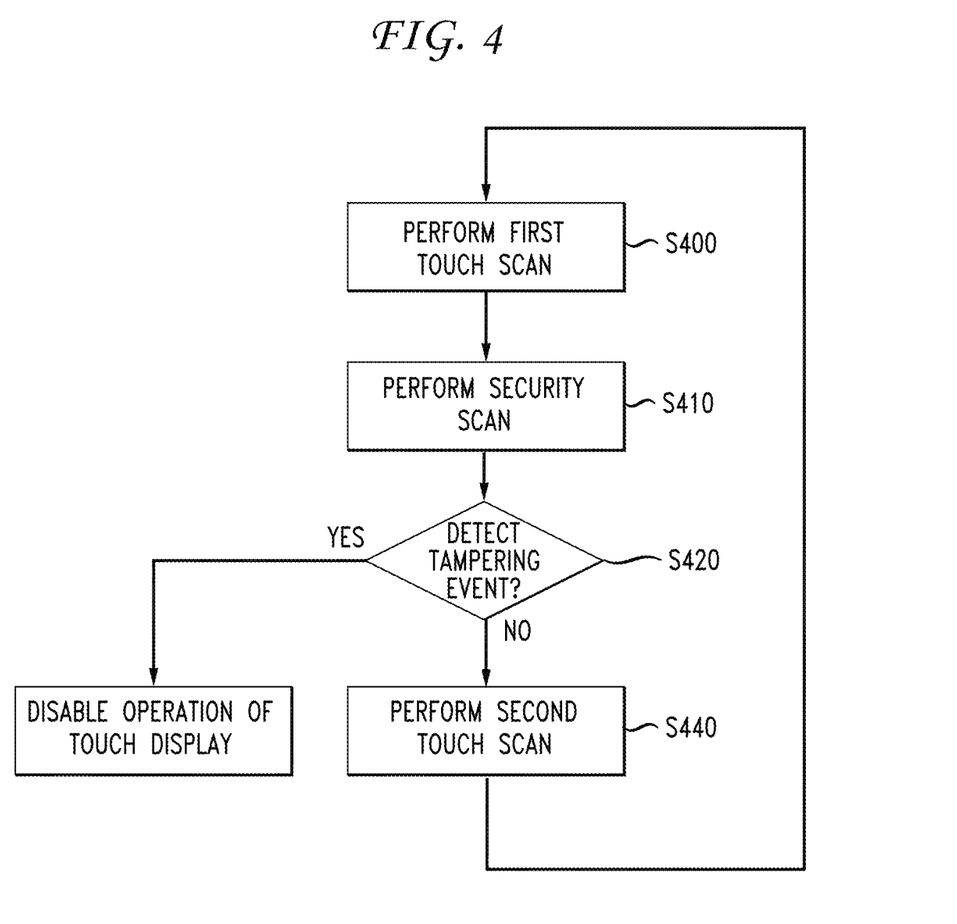
FIG. 4 describes a method of tamper detection, according to an aspect of the present disclosure.

FIG. 4 describes a method of tamper detection, according to an aspect of the present disclosure. As mentioned, touch display 210 has processor 312, sensing processor 316 and tampering processor 318, each performing one of more functionalities, as described above. Furthermore, as described, functionalities of processor 312, sensing processor 316 and tampering processor 318 may be combined together and performed by processor 312. Accordingly, processor 312 executes a set of computer readable instructions (which may be stored on memory 135 of POS device 100) in order to carry out the functionalities described below with reference to FIG. 4. FIG. 4 will be described from the perspective of touch display 210.

At S400, touch display 210 performs a touch scan (first touch scan) of display 300 in order to determine if a touch input has been received at any location on display 300. Such touch may be received in response to some type of content/information displayed on display 300. For example, in a context of financial transactions, an interface prompting a user (e.g., a merchant, a customer, etc.) to enter relevant information such as a username, a password, a tip amount, a signature, an e-mail, a command for completing a transaction or initiating a new one, etc., may be displayed on display 300, to which a user may provide an answer through a touch input.

In one example, performance of the first touch scan includes controlling gate driver 308 to generate and provide driving (excitation) signals to ITO traces 322(1), 322(2), . . . , 322(q) of transparent conductive layer 302, as described above, in order for sensing circuit 316 to sense a touch. In addition, any known or to be developed method for sensing a touch input on display 300 may be utilized.

At S410 and after performing the first touch scan, touch display 210 performs a security scan of display 300 to determine if touch display 210 (and more generally POS device 100) has been tampered with or not. As described above, a tampering (e.g., a physical tampering) with touch display 210 can damage one or more sensors and/or a portion of ITO traces 304 at a location on display 300 such that it results in short circuits, breaks in the circuit, or other changes in voltage outside of ordinary threshold levels, which would typically indicate a tampering attempt.

The security scan of display 300 can be sequentially performed in a similar manner as the sequential driving of the ITO traces 322(1), 322(2), . . . , 322(q) for sensing a touch during the first touch scan, as described above. However, instead of, for example, searching for any sign of change in capacitance, resistance, inductance and/or any combination thereof, which would be indicative of a touch input, during driving of ITO traces 322(1), 322(2), . . . , 322(q) (e.g., by tampering driver 320), tampering processor 318 searches for signs indicative of short circuits, breaks in the circuit (non-conductive), or other changes in voltage outside of ordinary threshold levels, which would typically indicate a tampering attempt.

At S420, touch display 210 determines if a tampering event is detected (i.e., if touch display 210 (and more generally POS device 100) has been tampered with). Touch display 210 determines that a tampering event is detected based on the result of the security scan performed at S410. For example, upon detecting a short circuit, a break in the circuit (e.g., an open circuit), or other changes in voltage outside of ordinary thresholds, touch display 210 determines that touch display 210 has been tampered with. As mentioned above, such short circuit, a break in the circuit, etc., may result from an attempt to physically intrude into POS device 100 via touch display 210. Such intrusion may be attempted by a merchant or a customer engaging in a financial transaction using POS device 100, another unauthorized agent attempting to plant a bug or a malware inside POS device 100, etc. Accordingly, at S430, touch display 210 automatically self-destructs itself (disables touch display 210) so that touch display 210 (and more generally POS device 100) will become inoperable. While rendering POS device 100 is one example of disabling at S430, disabling of POS device 100 also includes deleting encryption keys stored on POS device 100 for purposes of conducting transactions (e.g., financial transactions), rendering POS device 100 incapable of processing transactions (e.g., financial transactions), etc. Thereafter, the process ends.

However, if at S430 and based on a result of the security scan, touch display 210 determines that touch display 210 has not been tampered with, then at S440, touch display 210 may perform a next scheduled touch scan (second touch scan) for sensing a touch input in a similar manner as the first touch scan described above.

Thereafter, the process reverts back to S400 and touch display 210 repeats S400 to S440 continuously until a tampering event has been detected.

In one example, while the first and second touch scans can be performed according to a first frequency (at a first sampling rate), which may be determined based on a clock signal generated by sensing processor 316 the security scan can be performed at a second frequency (at a second sampling rate). The second sampling rate can be the same as the first sampling rate, or lower than the first sampling rate or higher than the first sampling rate.

For example, if sensing processor 316 generates a clock signal according to which ITO traces 304 are driven 5 times per seconds (a first sampling rate of 5 scans per second) for performing touch scans, then tampering processor 318 generates another clock signal that performs a new security scan after every touch scan, after every other touch scans, after every three touch scans, after every four touch scans, once after every 5 touch scans, twice for every touch scan, etc.

In one example, sensing and tampering processors 316 and 318 can simultaneously perform a touch scan and a security scan on different portions of display 300. For example, when ITO trace 322(1) is driven to perform a sequential touch scan of ITO traces 322(1) and ITO traces 324(1), 324(2), . . . , 324(p) for sensing a touch, tampering processor 318 can simultaneously perform a security can of any one or more of ITO traces 322(2), . . . , 322(q) to determine a possible tampering event (possible tampering with touch display 210). Thereafter and once the driving of gate line ITO traces 324(1), 324(2), . . . , 324(p) are completed as part of the touch scan, the sequential touch sensing may proceed to ITO traces 322(2) and at the same time, ITO traces 324(1), 324(2), . . . , 324(p) may be driven for performing the security scan. Accordingly, the performance of touch scans and security scans of ITO traces 304 of display 300 may be said to be interchangeable.

In one example, sensing and tampering processors 316 and 318 can simultaneously perform a sensing scan and a security scan of the same portion of display 300 (the same ITO traces 304 of display 300). In this example, in order to perform the sensing scan and the security scan of the same ITO traces 304 simultaneously, a separate connection is provided between each intersection of ITO traces 304 and tampering processor 318. Accordingly, while each one of ITO traces 304 is scanned for a touch (touch sensing), through this separate connection tampering processor 318 simultaneously performs a security scan of the same one of ITO traces 304. These separate connections may be driven by a dedicated driving circuit similar to the gate driver 308 and/or data driver 310. Based on signals received from these separate connections, tampering processor 318 determines whether a scanned ITO trace is conducting or not thus determining whether touch display 210 has been tampered with or not.

Alternatively, simultaneous performance of a touch scan and a security scan of display 300 is such that over a given time period, a first portion of ITO traces 304 are driven to perform the touch scan while a second portion of the ITO traces 304 are driven to perform the security scan.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in a non-volatile memory or applications stored in magnetic/non-magnetic storage (e.g., flash and solid state storage devices, etc.), which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

FIG. 5 illustrates an exemplary computing system to implement the POS device of FIG. 1, according to an aspect of the present disclosure. For example, any of the computer systems or computerized devices described herein may include at least one computing system 500, or may include at least one component of the computer system 500 identified in FIG. 5. The computing system 500 of FIG. 5 includes one or more processors 510 and memory 510. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor 510 and main memory 520 may be connected via a local microprocessor bus, and mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor 410. Mass storage device 530 can store the system software for implementing embodiments of the present invention for purposes of loading that software into main memory 510.

Portable storage device 540 operates in conjunction with a portable non-volatile storage medium, such as a compact disk or Digital video disc, to input and output data and code to and from the computer system 500 of FIG. 5. The system software for implementing embodiments of the present invention may be stored on such a portable medium and input to the computer system 500 via the portable storage device 540.

Main memory 520, mass storage device 530, or portable storage 540 can in some cases store sensitive information, such as transaction information, health information, or cryptographic keys, and may in some cases encrypt or decrypt such information with the aid of the processor 510. Main memory 520, mass storage device 530, or portable storage 540 may in some cases store, at least in part, instructions, executable code, or other data for execution or processing by the processor 510.

Output devices 550 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 570. The printer may be inkjet, laser/toner based, thermal, or some combination thereof. In some cases, the output device circuitry 550 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 550 may include any ports, plugs, antennae, or any other components necessary for the communication types listed above, such as cellular Subscriber Identity Module (SIM) cards.

Input devices 560 may include circuitry providing a portion of a user interface. Input devices 560 may include an alpha-numeric keypad, such as a keyboard, for inputting alpha-numeric and other information, or a pointing device, such as a mouse, a trackball, stylus, or cursor direction keys. Input devices 560 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 560 may include any ports, plugs, antennae, or any other components necessary for the communication types listed above, such as cellular SIM cards.

Display system 570 may include a liquid crystal display (LCD), a plasma display, an organic light-emitting diode (OLED) display, an electronic ink or "e-paper" display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem, a router, an antenna, a printer, a bar code scanner, a quick-response ("QR") code scanner, a document/image scanner, a visible light camera, a thermal/infrared camera, an ultraviolet-sensitive camera, a night vision camera, a light sensor, a battery, a power source, or some combination thereof.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 500 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 500 may be part of a multi-computer system that uses multiple computer systems 500, each for one or more specific tasks or purposes. For example, the multi-computer system may include multiple computer systems 500 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 500 from different networks communicatively coupled together via the internet (also known as a "distributed" system).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, non-volatile memory, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A non-transitory computer-readable medium comprising computer-readable instructions, which when executed by at least one processor, cause the at least one processor to:
    perform a touch scan of a first portion of conductive lines on a touch screen to detect a touch; and
    perform a security scan of a second portion of the conductive lines on the touch screen to detect a tamper event.

2. The non-transitory computer-readable medium according to claim 1, wherein the execution of the computer-readable instructions by the at least one processor cause the at least one processor to perform the touch scan and the security scan simultaneously.

3. The non-transitory computer-readable medium according to claim 1, wherein the execution of the computer-readable instructions by the at least one processor cause the at least one processor to perform a security scan of the first portion of the conductive lines, after performing the touch scan of the first portion of the conductive lines on the touch screen.

4. The non-transitory computer-readable medium according to claim 3, wherein the execution of the computer-readable instructions by the at least one processor further cause the at least one processor to:
    determine that a tamper event occurred if the security scan of the second portion of the conductive lines on the touch screen indicates that at least one of the conductive lines is short circuited or not conductive; and
    disable operation of the touch screen upon determining that the tamper event occurred.

5. The non-transitory computer-readable medium according to claim 1, wherein the execution of the computer-readable instructions by the at least one processor further cause the at least one processor to perform a touch scan of the second portion of the conductive lines on the touch screen, after performing the security scan of the second portion of the conductive lines on the touch screen.

6. The non-transitory computer-readable medium according to claim 5, wherein the execution of the computer-readable instructions by the at least one processor further cause the at least one processor to:
    determine that a tamper event occurred if the security scan of the second portion of the conductive lines on the touch screen indicates that at least one of the conductive lines is short circuited or not conductive; and
    disable operation of the touch screen upon determining that the tamper event occurred.

7. The non-transitory computer-readable medium according to claim 6, wherein the security scan detects an unauthorized physical intrusion into the touch screen or an electronic device coupled to the touch screen.

8. The non-transitory computer-readable medium according to claim 1, wherein the conductive lines are indium tin oxide (ITO) traces.

9. A system for tamper detection of a touch screen, the system comprising:
    a collection of conductive lines on the touch screen;
    a touch controller connected to the conductive lines and configured to detect a touch event; and
    a tamper controller connected to the conductive lines and configured to detect a tamper event at least one processor.

10. The system according to claim 9, wherein the tamper controller is configured to detect the tamper event by:
    interchangeably performing a touch scan and a security scan of the conductive lines, the touch scan being a scan for detecting a touch, the security scan being a scan for detecting a tamper event; and
    disabling operation of the touch screen upon detecting the tamper event.

11. The system according to claim 10, wherein the tamper controller is configured to detect the tamper event if the security scan indicates that at least one of the conductive lines is short circuited or not conductive.

12. The system according to claim 9, wherein the tamper controller is configured to detect the tamper event by,
   interchangeably performing a touch scan and a security scan of a first portion of the conductive lines on the touch screen; and
   concurrent with the performing one of the touch scan and the security scan of the first portion of the conductive lines, performing one of a touch scan or a security scan of a second portion of the conductive lines on the touch screen.

13. The system according to claim 9, wherein the tamper event is an unauthorized physical intrusion into the touch screen or an electronic device coupled to the touch screen.

14. The system according to claim 9, further comprising:
   a card reader configured to read information stored on a card to perform a transaction, the read information being sent to the at least one processor for completing the transaction.

15. The system according to claim 9, wherein the conductive lines are indium tin oxide (ITO)traces.

16. A device comprising:
   at least one processor; and
   memory configured to store computer-readable instructions, which when executed by the at least one processor, cause the at least one processor to:
      perform a touch scan of a first portion of conductive lines on a touch screen to detect a touch; and
      perform a security scan of a second portion of the conductive lines on the touch screen to detect a tamper event.

17. The device of claim 16, wherein the execution of the computer-readable instructions by the at least one processor cause the at least one processor to perform the touch scan and the security scan simultaneously.

18. The device of claim 16, wherein the execution of the computer-readable instructions by the at least one processor cause the at least one processor to:
   perform a security scan of the first portion of the conductive lines, after performing the touch scan of the first portion of the conductive lines on the touch screen;
   determine that a tamper event occurred if the security scan of the second portion of the conductive lines on the touch screen indicates that at least one of the conductive lines is short circuited or not conductive; and
   disable operation of the touch screen upon determining that the tamper event occurred.

19. The device of claim 16, wherein the execution of the computer-readable instructions by the at least one processor further cause the at least one processor to:
   perform a touch scan of the second portion of the conductive lines on the touch screen, after performing the security scan of the second portion of the conductive lines on the touch screen;
   determine that a tamper event occurred if the security scan of the second portion of the conductive lines on the touch screen indicates that at least one of the conductive lines is short circuited or not conductive; and
   disable operation of the touch screen upon determining that the tamper event occurred.

20. The device of claim 16, wherein the conductive lines are indium tin oxide (ITO) traces.

* * * * *